US007863843B2

(12) United States Patent
Tamai et al.

(10) Patent No.: US 7,863,843 B2
(45) Date of Patent: Jan. 4, 2011

(54) COLD RATTLE REDUCTION CONTROL SYSTEM

(75) Inventors: Goro Tamai, West Bloomfield, MI (US); Frank W. Schipperijn, Rochester, MI (US); William L. Aldrich, III, Davisburg, MI (US); Dean A. Hauersperger, Troy, MI (US); Steven A. Tervo, Howell, MI (US); David J. Hajdyla, Canton, MI (US)

(73) Assignee: GM Global Technology Operations Inc.

(*) Notice: Subject to any disclaimer, the term of this patent is extended or adjusted under 35 U.S.C. 154(b) by 335 days.

(21) Appl. No.: 11/455,298

(22) Filed: Jun. 16, 2006

(65) Prior Publication Data

US 2007/0290644 A1 Dec. 20, 2007

(51) Int. Cl.
*H02P 7/00* (2006.01)

(52) U.S. Cl. ....................... 318/432; 318/139; 318/430; 318/434

(58) Field of Classification Search ................. 318/430, 318/432, 434, 139, 254.1
See application file for complete search history.

(56) References Cited

U.S. PATENT DOCUMENTS

| | | | | |
|---|---|---|---|---|
| 6,367,570 | B1 * | 4/2002 | Long et al. | 180/65.2 |
| 6,408,968 | B1 | 6/2002 | Wakashiro et al. | |
| 6,450,274 | B1 | 9/2002 | Konno et al. | |
| 6,897,629 | B2 * | 5/2005 | Wilton et al. | 318/139 |
| 6,902,028 | B2 * | 6/2005 | Takatsuka et al. | 180/446 |
| 7,122,979 | B2 * | 10/2006 | Wilton et al. | 318/400.09 |
| 2002/0145286 | A1 | 10/2002 | Kiefer | |
| 2004/0222037 | A1 * | 11/2004 | Takatsuka et al. | 180/446 |
| 2005/0113211 | A1 * | 5/2005 | Surewaard et al. | 477/92 |

* cited by examiner

*Primary Examiner*—Paul Ip

(57) ABSTRACT

A control system for controlling an electric machine (EM) of a hybrid electric vehicle is provided. The system includes: an enable module that selectively enables a motoring mode of the EM based on ambient air temperature; and an EM control module that commands the EM to provide motoring torque as a function of engine speed during the motoring mode.

20 Claims, 3 Drawing Sheets

COLD RATTLE REDUCTION CONTROL SYSTEM

FIELD

The present disclosure relates to methods and systems for controlling an electric machine of a hybrid vehicle.

BACKGROUND

The statements in this section merely provide background information related to the present disclosure and may not constitute prior art.

As an alternative to the internal combustion engine (ICE), automotive manufacturers have developed hybrid powertrains that include both an electric machine and an internal combustion engine. During operation, hybrid powertrains use one or both of the power sources to improve efficiency.

Hybrid electric vehicles (HEVs) use either a parallel drivetrain configuration or a series drivetrain configuration. In the parallel HEV, the electric machine works in parallel with the ICE to combine the power and range advantages of the ICE with the efficiency and the electrical regeneration capability of the electric machine. In the series HEV, the ICE drives an alternator to produce electricity for the electric machine, which drives a transaxle. This allows the electric machine to assume some of the power responsibilities of the ICE, thereby permitting the use of a smaller and more efficient ICE.

One drawback to either configuration is that the ICE does not provide a constant, smooth, level of torque. Pulses in torque, inherent to ICEs, are referred to as torsional vibration. The torsional vibration can be due to combustion forces and/or hardware used in the engine design. The amplitude of these vibrations can have adverse effects at different speeds and loads depending on the engine configuration. In some applications, as the load demand is increased, the torsional vibration increases to levels that can produce noise and vibration levels that impact drivability. In other applications, cold ambient air conditions during startup induce torsional vibration which can be perceived as a "rattle." Such conditions are undesirable.

SUMMARY

Accordingly, a control system for controlling an electric machine (EM) of a hybrid electric vehicle is provided. The system includes: an enable module that selectively enables a motoring mode of the EM based on ambient air temperature; and an EM control module that commands the EM to provide motoring torque as a function of engine speed during the motoring mode.

In other features, a method of controlling an electric machine (EM) of a hybrid electric vehicle is provided. The method includes: selectively enabling a motoring mode based on ambient air temperature; and controlling the EM to provide motoring torque as a function of engine speed during the motoring mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
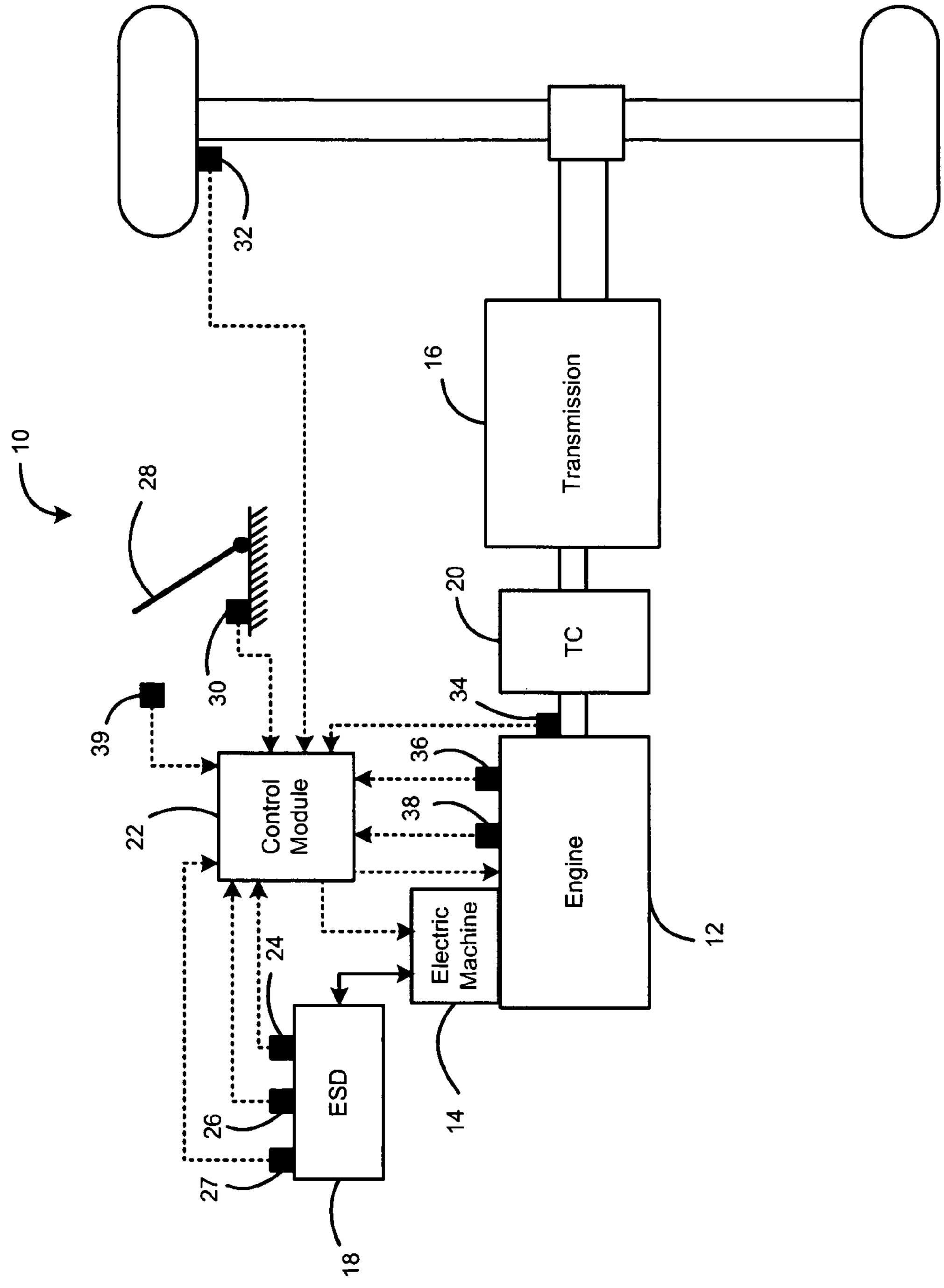
FIG. 1 is a functional block diagram of a hybrid vehicle.

The following description is merely exemplary in nature and is not intended to limit the present disclosure, application, or uses. It should be understood that throughout the drawings, corresponding reference numerals indicate like or corresponding parts and features.

Referring now to FIG. 1, a hybrid vehicle is shown generally at 10. The hybrid vehicle 10 is shown to include an engine 12 and an electric machine 14, which selectively drive a transmission 16. More specifically, the electric machine 14 supplements the engine 12 to produce drive torque to drive the transmission 16. In this manner, fuel efficiency is increased and emissions are reduced. In one mode, the engine 12 drives the electric machine 14 to generate power used to recharge an energy storage device (ESD) 18, such as a battery. In another mode, the electric machine 14 drives the transmission 16 using energy from the ESD 18.

The engine 12 and the electric machine 14 can be coupled via a belt-alternator-starter (BAS) system (not shown) that includes a belt and pulleys. Alternatively, the engine 12 and the electric machine 14 can be coupled via a flywheel-alternator-starter (FAS) system (not shown), wherein the electric machine 14 is operably disposed between the engine 12 and the transmission 16. It is anticipated that other systems can be implemented to couple the engine 12 and the electric machine 14 including, but not limited to, a chain or gear system that is implemented between the electric machine 14 and a crankshaft.

The transmission 16 can include, but is not limited to, a continuously variable transmission (CVT), a manual transmission, an automatic transmission and an automated manual transmission (AMT). Drive torque is transferred from the engine 12 to the transmission 16 through a coupling device 20. The coupling device 20 can include, but is not limited to, a friction clutch or a torque converter depending upon the type of transmission implemented. The transmission 16 multiplies the drive torque generated by the engine 12 and/or electric machine 14 through one of a plurality of gear ratios to drive a vehicle driveline.

A control module 22 regulates operation of the vehicle 10 during cold start conditions based on a cold rattle control method. A current sensor 24 generates a current signal that is sent to the control module 22 and a voltage sensor 26 generates a battery voltage signal that is sent to the control module 22. A battery temperature sensor 27 generates a battery temperature signal that is sent to the control module 22. The control module 22 determines a state of charge (SOC) of the ESD 18 based on the current and voltage signals. There are several methods that can be implemented to determine the SOC. An exemplary method is disclosed in commonly assigned U.S. Pat. No. 6,646,419, issued on Nov. 11, 2003 and entitled State of Charge Algorithm for Lead-Acid Battery in a Hybrid Electric Vehicle, the disclosure of which is expressly incorporated herein by reference.

An accelerator pedal 28 is provided and enables a driver to indicate a desired engine torque output. A position sensor 30 is responsive to a position of the accelerator pedal 28. The position sensor 30 generates a position signal that indicates the position of the accelerator pedal 28. A vehicle speed sensor 32 generates a speed signal based on a rotational speed of a wheel. The control module receives the speed signal and computes a vehicle speed. An engine speed sensor 34 generates an engine speed signal that is sent to the control module 22. A manifold absolute pressure signal generates a manifold absolute pressure signal that is sent to the control module 22. A coolant temperature sensor 38 generates a coolant temperature signal that is sent to the control module 22. An ambient air temperature sensor 39 generates an ambient air temperature signal that is sent to the control module 22. Based on the above mentioned signals, the control module 22 controls the electric machine to provide motoring torque to the engine 12 during engine rattle conditions to reduce noise.

Figure 2:
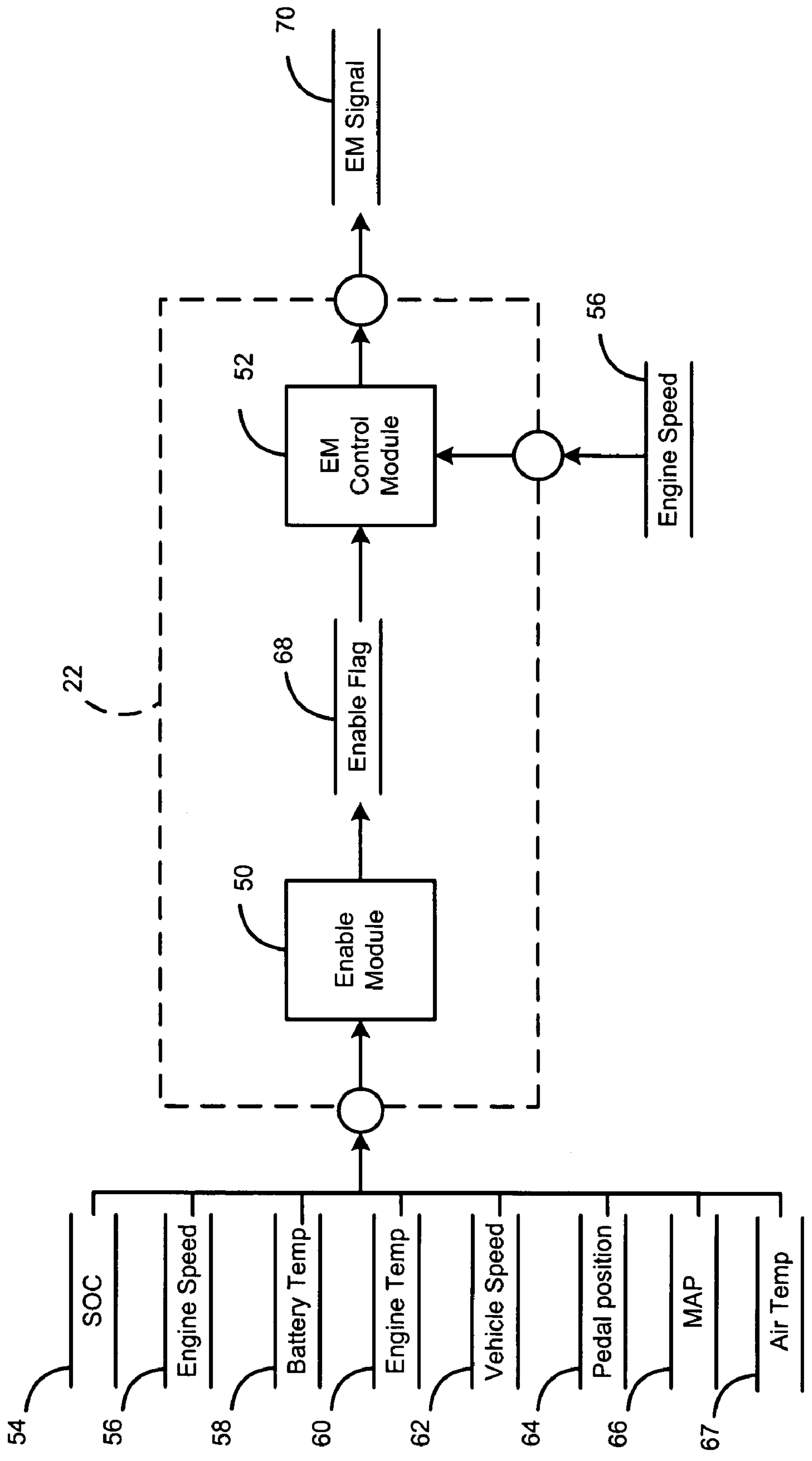
FIG. 2 is a dataflow diagram of a cold rattle reduction system.

Referring now to FIG. 2, a dataflow diagram illustrates various embodiments of a cold rattle reduction control system that may be embedded within the control module 22. Various embodiments of cold rattle reduction control systems according to the present disclosure may include any number of sub-modules embedded within the control module 22. The sub-modules shown may be combined and/or further partitioned to similarly control the electric machine 14 (FIG. 1) during cold start conditions. In various embodiments, the control module 22 of FIG. 2 includes an enable module 50 and an electric machine (EM) control module 52. Inputs to the cold rattle reduction control system may be sensed from the vehicle 10, received from other control modules (not shown) within the vehicle 10, or determined by other sub-modules within the control module 22.

The enable module 50 receives as input, the battery state of charge (SOC) 54, engine speed 56, battery temperature 58, engine temperature 60, vehicle speed 62, accelerator pedal position 64, manifold absolute pressure 66, and ambient air temperature 67. The enable module 50 selectively enables the EM control module 52 to activate the electric machine 14 (FIG. 1) during cold rattle conditions based on the received inputs. The enable module 50 sets an enable flag 68 to TRUE if the enable conditions are met. Otherwise, the enable flag 68 remains FALSE.

The EM control module 52 receives as input the enable flag 68 and engine speed 56. The EM control module 52 controls the electric machine 14 (FIG. 1) to provide motoring torque to supplement engine torque based on the enable flag 68. When the enable flag 68 is TRUE, an EM signal 70 is generated. The EM signal 70 is generated as a function of engine speed 56. To reduce busyness in the electric machine 14 (FIG. 1), the EM signal 70 is generated for at least a minimum time period (X). The EM signal may be regulated based on a maximum time period (Y). The time between generation of the EM signal 70 can be regulated based on a time period (Z). The time periods (X, Y, and Z) can be predetermined based on electric machine response time characteristics.

Figure 3:
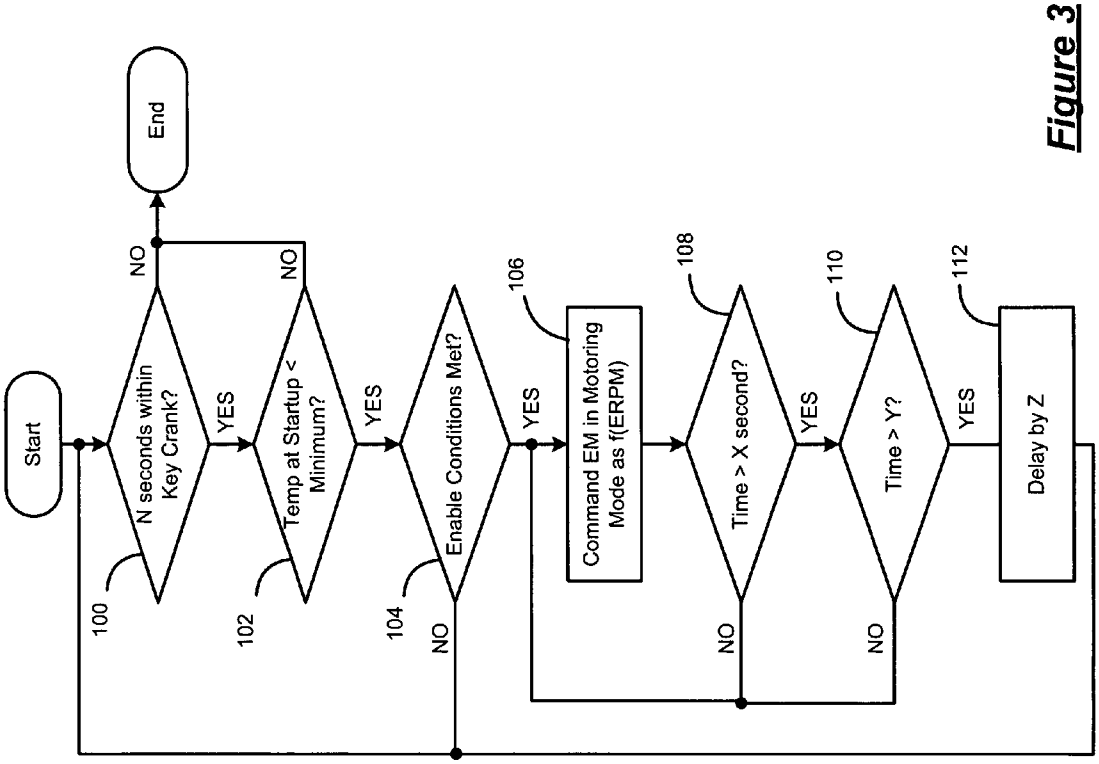
FIG. 3 is a flowchart illustrating a cold rattle reduction method.

Referring now to FIG. 3, a flowchart illustrates a cold rattle reduction method performed by the control module 22. The method may be run continually after a key crank event. If the current time is within a predetermined time (N) within the key crank event at 100 and the temperature (either engine coolant or ambient air temperature) at startup is less than a minimum temperature at 102, control proceeds to evaluate the enable conditions at 104. Otherwise control exits. If the enable conditions are met at 104, control commands the electric machine 14 (FIG. 1) to provide motoring torque at 106. The motoring torque is controlled as a function of engine speed. Enable conditions can include: engine speed within an engine speed range; SOC greater than a percent threshold; engine temperature less than a temperature threshold; battery temperature greater than a temperature minimum; pedal position greater than a pedal minimum; vehicle speed greater than a speed minimum; and MAP greater than a MAP threshold.

The electric machine is commanded to provide motoring torque for at least a predetermined minimum period (X). In various embodiments the minimum period is two seconds. If the time of commanding torque is less than the predetermined time period (X) at 108, control continues to control the electric machine 14 (FIG. 1) at 106. Otherwise if the time of commanding torque is greater than a predetermined maximum period (Y), control delays for time (Z) before evaluating the enable conditions at 100. In various embodiments the maximum period (Y) is eight seconds and the delay time (Z) is two seconds.

As can be appreciated, all comparisons made in the cold rattle control method can be implemented in various forms depending on the selected values for the minimums, maximums, ranges, and thresholds. For example, a comparison of "greater than" may be implemented as "greater than or equal to" in various embodiments. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control module for controlling an electric machine (EM) of a hybrid electric vehicle, comprising:

an enable module that selectively enables a motoring mode of the EM based on ambient air temperature; and an EM control module that controls the EM to provide motoring torque as a function of engine speed during the motoring mode based on when the motoring mode is enabled by the enable module.

2. The control module of claim 1 wherein the enable module selectively enables the motoring mode based on a time since engine startup.

3. The control module of claim 1 wherein the enable module selectively enables the motoring mode based on a state of charge of batteries of the electric machine.

4. The control module of claim 1 wherein the enable module selectively enables the motoring mode based on at least one of temperature parameters and vehicle parameters.

5. The control module of claim 4 wherein the vehicle parameters are engine speed, manifold absolute pressure, pedal position, and vehicle speed.

6. The control module of claim 1 wherein the temperature parameters are engine coolant temperature and battery temperature.

7. The control module of claim 1 wherein the EM control module regulates the time the EM is commanded to provide motoring torque based on a predetermined minimum period and a predetermined maximum period.

8. The control module of claim 7 wherein the EM control module regulates the time between commanding the EM to provide motoring torque based on a predetermined minimum period.

9. A method of controlling a control module that controls an electric machine (EM) of a hybrid electric vehicle, the method comprising:

using an enable module, selectively enabling a motoring mode based on ambient air temperature; and based on the motoring mode from the enable module, controlling an EM control module to control the EM to provide motoring torque as a function of engine speed during the motoring mode.

10. The method of claim 9 wherein the selectively enabling a motoring mode is based on at least one vehicle parameter.

11. The method of claim 10 wherein the at least one vehicle parameter is at least one of manifold absolute pressure, engine speed, vehicle speed, and accelerator pedal position.

12. The method of claim 9 wherein the selectively enabling a motoring mode is based on at least one temperature parameter.

13. The method of claim 12 wherein the temperature parameter is at least one of engine coolant temperature and battery temperature.

14. The method of claim 9 wherein the selectively enabling a motoring mode is based on a state of charge of a battery for the electric machine.

15. The method of claim 9 further comprising regulating the controlling of the electric machine based on a minimum control period and a maximum control period.

16. The method of claim 9 further comprising regulating a time between controlling of the electric machine based on a delay period.

17. The method of claim 9 where the selectively enabling a motoring mode is based on a time since an engine startup.

18. A method of controlling a control module that controls and electric machine (EM) of a hybrid electric vehicle, the method comprising:

using an enable module, selectively enabling a smoothing mode of the EM after engine startup if an ambient air temperature is less that a temperature threshold; and based on the smoothing mode from the enable module, controlling an EM control module to control the EM to provide supplemental engine drive torque as a function of engine speed while the smoothing mode is enabled.

19. The method of claim 18 further comprising disabling the smoothing mode at a predetermined time after a key-on crank event.

20. The method of claim 18 further comprising disabling the smoothing mode based on at least one of a desired engine torque and a vehicle temperature.

* * * * *